(No Model.) 2 Sheets—Sheet 1.
E. A. TRAPP.
DUMPING CAR.
No. 513,447. Patented Jan. 23, 1894.
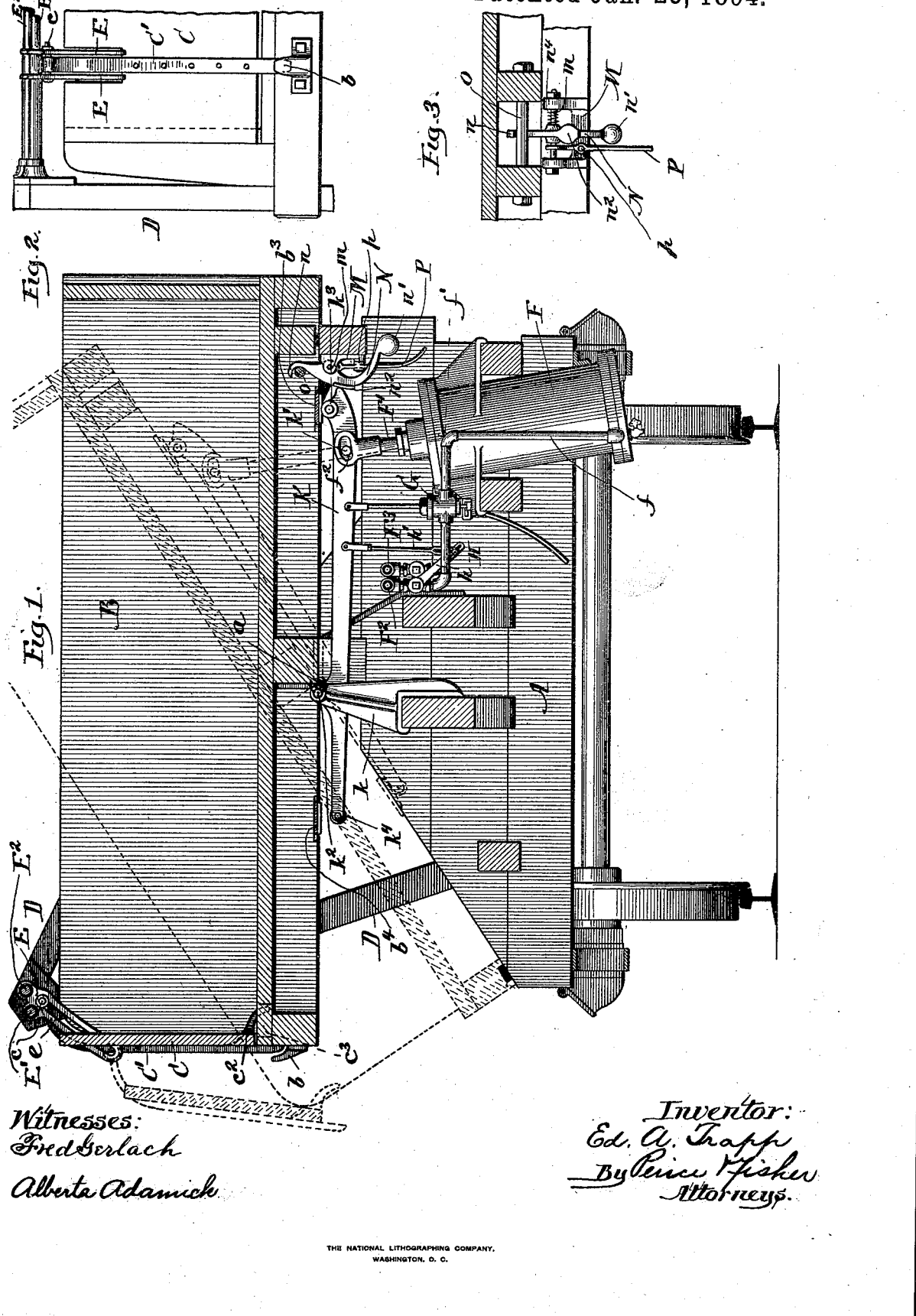
Witnesses:
Fred Gerlach
Alberta Adamick
Inventor:
Ed. A. Trapp
By Pierce & Fisher
Attorneys.

(No Model.) 2 Sheets—Sheet 2.
E. A. TRAPP.
DUMPING CAR.
No. 513,447. Patented Jan. 23, 1894.
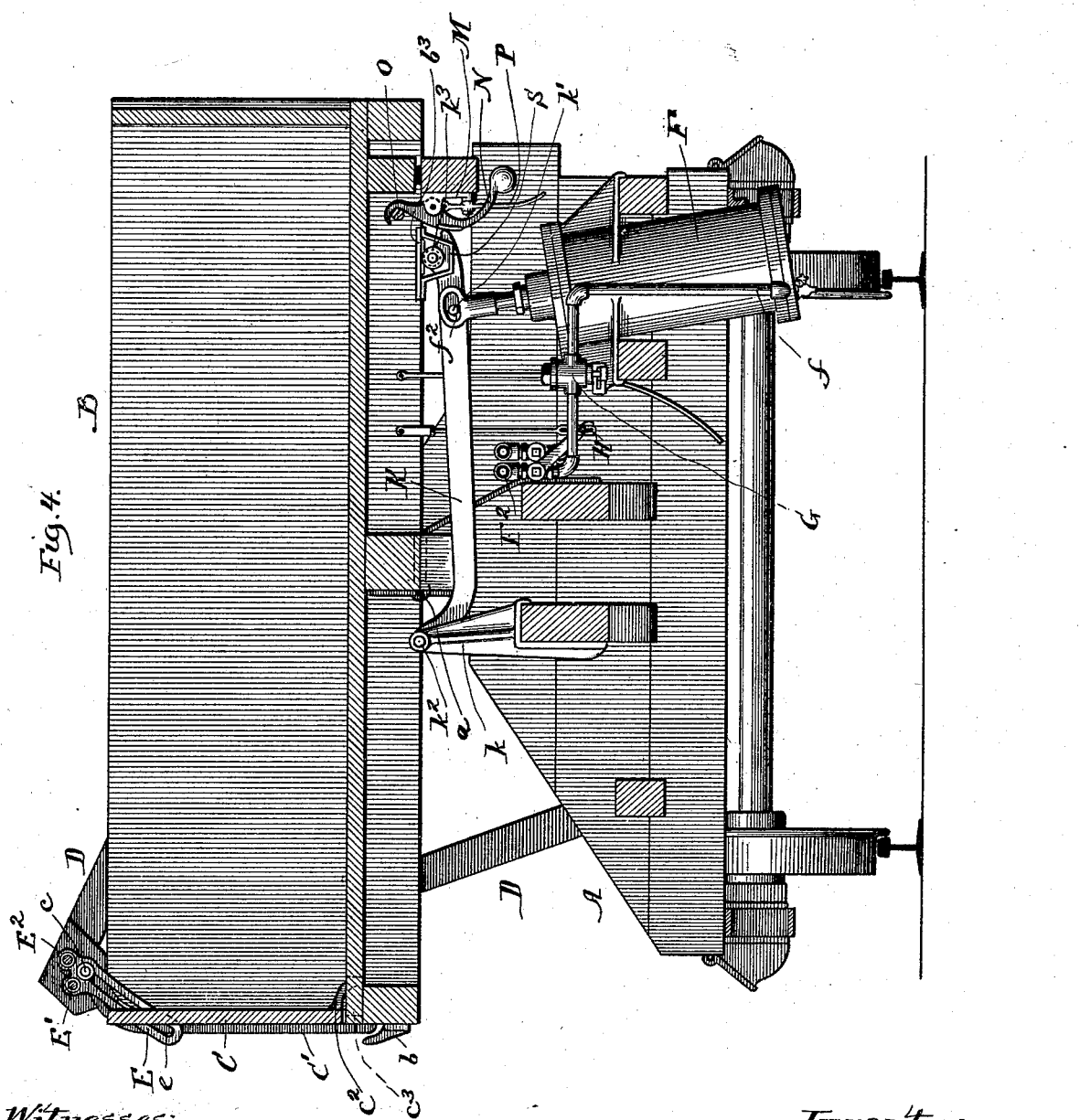

UNITED STATES PATENT OFFICE.

EDWARD A. TRAPP, OF CHICAGO, ILLINOIS.

DUMPING-CAR.

SPECIFICATION forming part of Letters Patent No. 513,447, dated January 23, 1894.

Application filed September 25, 1893. Serial No. 486,374. (No model.)

*To all whom it may concern:*

Be it known that I, EDWARD A. TRAPP, a citizen of the United States, residing at Chicago, Cook county, Illinois, have invented certain new and useful Improvements in Dumping-Cars, of which I do declare the following to be a full, clear, and exact description, reference being had to the accompanying drawings, forming a part of this specification.

My present invention has relation more particularly to that class of dumping cars in which the body is so sustained upon the truck frame that it can be tilted to discharge its load, and in which the tilting of the body is effected through the medium of a suitable dumping cylinder located beneath the same. An example of this type of car is illustrated in Letters Patent No. 493,317, granted to me March 14, 1893.

The object of the present invention is, first, to provide improved means for sustaining the door of a car; second, to improve and simplify the construction of dumping mechanism beneath the car body; and, third, to provide an improved construction of automatic latch for locking the car body in horizontal position until it is to be dumped to effect the discharge of the load. These several objects of invention I have accomplished by the means hereinafter described, illustrated in the accompanying drawings and particularly pointed out in the claims at the end of this specification.

Figure 1 is a view in cross section through a dumping car embodying my invention, the dumping mechanism being shown in elevation. Fig. 2 is a side view of a portion of one end of the car body, and the adjacent standard and sustaining rods for the door. Fig. 3 is a detail view in side elevation of the automatic latch mechanism, the car floor being shown in section. Fig. 4 is a view in cross section through a dump car embodying my invention, certain features being shown as of modified construction.

A designates the truck frame which will be of suitable construction and upon this frame is mounted the car body B, this body being suitably pivoted as at $a$ to the truck frame in order to permit the body to be tilted laterally to effect the discharge of its load. The side of the car body that is adapted to be tipped downward and through which the load will be discharged is closed by means of a door C, when the car is in its normal horizontal position. This door C is not suspended from the body of the car but is sustained by a fixed support independent thereof consisting preferably of the end standards D, that rise from the truck frame of the car at its ends and serve to carry lost motion connections that sustain the door in such manner that the door is permitted to travel for a slight distance with the car body as the latter is tilted to discharge its load. My purpose in allowing the door to travel downward a slight distance with the car body as the latter is tilted, is to insure that the load shall remain within the car body until it is turned so far in downward direction as to aid in the complete and easy tilting of the body. The advantage of thus retaining the load during the initial tilting of the car body is manifest, because if the door was immediately opened the load would discharge therefrom at once and consequently would not aid in the initial downward movement of the car body.

In the form of my invention illustrated in the drawings, the lost motion connection between the door C and its fixed support consists of links E having slots $e$ therein to receive the pivot pins $c$ that project from the straps C' attached to the door C. Preferably two links E will be placed adjacent each other as shown in Fig. 2 and through the slots of these links will extend the ends of the pivot pin $c$ of the door. The strap C' that carries this pivot pin is preferably bent inward at its upper end as shown in Fig. 1. I have illustrated but one of the end standards D that comprise the fixed support for the door C but it will be understood that at the opposite end of the car a like standard will be employed together with links E as shown in Figs. 1 and 2 of the drawings. The upper ends of the links E are perforated to receive the tie-rods E' and E² that are united to the end supports D and serve to firmly brace these supports against the severe strains to which they are subjected. If desired, a single rod might be used but in such case this single rod should be of polygonal outline in order to securely hold the links against turning. The rods E' and $E^2$ while affording a secure support for the links E still have sufficient elasticity to yield slightly under strain and thus guard against any binding of the pivot bolts within the links.

In order to retain the door C in closed position during the initial downward tilting of the car body, I prefer to provide the body with a step or projection $b$ with which the lower end of the strap $C'$ will engage and preferably also this strap is furnished with a guide arm or extension $c^2$ that will enter a seat or notch in the car floor in order to insure the engagement of the step or projection $b$ with the lower end of the strap $C'$. That is to say, as the car body is tilted upward from the dotted position shown in Fig. 1, the door C, being pivotally sustained will occupy an approximately vertical position until the extension $c^2$ engages with the notch $c^3$ formed in the bottom of the car thereby drawing the pivoted door inward and causing the lower end of the rod $C'$ to pass behind the step or projection $b$.

From the foregoing description it will be seen that as the car body is tilted downward the door C, by reason of the fact that it is united by the lost motion connection with its fixed support, will partake of the initial downward movement of the car body until the pin $c$ reaches the end of the links E, when the downward movement of the door will be arrested and as the car body is further tilted the end of the strap $C'$ of the door C will pass from engagement with the step $b$, thereby permitting the weight of the load within the car body to discharge freely through its open side.

It is manifest that the feature of my invention which consists in sustaining the door by fixed supports through the medium of the lost motion connection so that the door can partake of the initial movement of the car during the tilting operation will be found of value, regardless of the mechanism by which the dumping of the car is effected.

Beneath the body of the car and suitably supported by the truck frame is mounted the dumping cylinder F, the opposite ends of which are provided with suitable pipes $f$ and $f'$ for the admission and escape of compressed air or other fluid. The pipes $f$ and $f'$ connect with the trunk pipes $F^2$ and $F^3$ that extend throughout the train in manner well understood in the art and in each of these pipes is interposed the escape valve casing G, the construction and mode of operation of which is described and claimed in an application for Letters Patent filed by me in the United States Patent Office August 25, 1893, Serial No. 484,105. The pipe $f'$ that leads to the upper end of the cylinder F, and which is illustrated by dotted lines in Fig. 1, is provided with an escape valve casing corresponding to the casing G, and the valves within these casings will be operated by the mechanism in my hereinbefore mentioned application. I have also illustrated one of the trunk pipes $F^2$ as provided with an automatic cut-off H that is controlled by a lever $h$ and rod $h'$, but as this automatic cut-off is described and claimed in my Letters Patent No, 493,317, of March 4, 1893, it need not be more fully described herein. The dumping cylinder F is provided with a piston, the rod $F'$ of which is connected at its upper end to a dumping lever K that is pivoted beneath the car body, and preferably upon a standard $k$ that rises from one of the beams of the truck frame. By preference, the piston rod $F'$ is provided with a slot $f^2$ in its upper end through which will pass the pin $k'$ that projects from the dumping lever K, this slot and pin affording a lost motion connection which permits the straight line movement of the piston rod while the pin of the dumping lever is describing the arc of a circle.

In the construction illustrated in Fig. 1 of the drawings the dumping lever K has connected thereto the rod $g$ whereby the escape valves are operated and as well also the rod $h'$ whereby the operation of the automatic cut-off valve is controlled.

In the preferred form of my invention, which is that illustrated in Fig. 1, the dumping lever K is entirely disconnected from the car body. This construction is advantageous for a variety of reasons, since it prevents the tilting mechanism from being effected in any manner by the wear and tear upon the car body or its fulcrum; it enables the car body to be removed without disturbing the tilting mechanism and other part and is a decided improvement over prior constructions in which the piston of the dumping cylinder is connected to the body of the car. In the preferred form of my invention the dumping lever K is extended upon each side of its fulcrum $k^2$ so that in the tilting operation one end of the lever shall engage the car body to effect its downward movement, while the opposite movement of the body will be effected by the engagement therewith of the opposite end of the lever. Preferably, the ends of the dumping lever K will be furnished with friction rollers $k^3$ and $k^4$ that will engage suitable bearing plates $b^3$ and $b^4$ attached to the under side of the body of the car.

From the foregoing description it will be seen that when the car body is to be tilted in downward direction compressed air will be admitted through the trunk pipe $F^2$ and the pipe $f$ into the lower end of the dumping cylinder F thereby causing the piston to move in upward direction, it being understood of course that the escape valve that is interposed in the pipe $f'$ at the opposite end of the dumping cylinder will be open to allow the escape of air from the upper end of the cylinder. As the piston and its rod $F'$ are thus moved upward, the dumping lever K is turned about its fulcrum $k^2$ and the free end of this lever engages the under side of the car body thereby tilting the body about its pivot point $a$ in order to effect the discharge of the load.

By employing a dumping lever K intermediate the dumping cylinder and the car body, I am enabled to secure a much more effective application of the power in tilting the car body. As the car body is thus tilted downward the opposite or free end of the dumping lever K will engage the car body and if now compressed air is admitted to the upper end of the dumping cylinder through the pipe $f'$ (it being understood of course that the escape valve within the casing G has been opened to permit the escape of air through the pipe $f$), the piston will be forced downward and the short end of the dumping lever K will engage the car body and restore it to horizontal position. It will be observed that the lever K serves not only to effect the tilting of the car body but serves to limit its movement and prevent the violent striking of the body against the truck frame.

The improved automatic latch mechanism whereby the body of the car is locked in horizontal position will next be described. Upon a suitable part of the truck frame is mounted a bracket M (see Fig. 3), between the arms of which extends the pivot rod $m$ on which is mounted the latch N. Preferably the upper end of the latch N is formed with a hook $n$ adapted to engage a pin or rod $o$ attached to the under side of the body of the car, while by preference the lower end of the latch N has a weight $n'$ that tends to throw the upper end of the latch out of engagement with the pin or rod $o$. Preferably also the body of the latch N has a bearing face $n^2$ with which will engage the dogging mechanism whereby this latch is held in locked position, and preferably the dogging mechanism consists of the free end of the dumping lever K that is so extended as to come opposite and bear against the latch N as seen in Fig. 1 of the drawings. The inner face of the latch N is by preference curved above the bearing face $n^2$, so that as soon as the lever K is moved in upward direction in order to tilt the car body the free end of the lever will pass along the curved upper portion of the latch and thus permit the pin $o$ to swing the curved upper end of the latch out of engagement from this pin, and so unlock the body of the car, but it is obvious that so long as the lever K is in its normal position the latch N cannot turn about its pivot point and consequently its hooked end will retain the car body securely locked. When the car body is tilted to discharge its load the free upper end of the latch N is turned from engagement with the rod or pin $o$, and the weight $n'$ (or a spring may be used for this purpose) will retain the latch in such position until the car body has been restored to horizontal position and until the free end of the lever K by contacting with the latch N has caused the hooked end of the latch to again engage the pin or rod $o$.

As it is sometimes desirable to tilt the car body by hand, I prefer to mount the latch N upon the rod $m$ in such manner that the latch can be moved horizontally in order to free it from engagement with the end of the dumping lever K, and for this reason the latch N is sustained upon the rod $m$ in such manner that it can slide thereon, but is held in normally central position by the spring $n^4$. To permit this disengagement of the latch from the lever K to be readily effected when the car body is to be tilted by hand, I prefer to employ the hand lever P that is pivotally mounted as at $p$ upon the bracket M, the upper end of this hand lever P being furnished with arms that straddle the rod $m$ and extend into position to engage the hub of the latch N. Hence it will be seen that when the hand lever P is shifted, the latch N can be moved laterally against the force of the spring $n^4$ until the latch passes from engagement with the free end of the dumping lever K, after which the weight $n'$ will cause the latch to pass from engagement with the rod or pin $o$ and thus allow the car body to be freely tilted.

In the form of my invention illustrated in Fig. 4 of the drawings the construction is in the main the same as that heretofore described, and I have therefore applied to the various parts the same letters of reference. In this form of the invention however, the dumping lever K does not extend upon both sides of its fulcrum, and consequently in order to effect the withdrawal of the car body to horizontal position after its load has been dumped, I provide the bottom of the car with a yoke S within which extends the friction roller mounted upon the free end of the dumping lever K. Hence it will be seen that after the dumping lever has been moved upward in order to tilt the car body to discharge the load, the car body will be retracted by a reverse movement of the lever by reason of the engagement of the friction roller at the end of the lever with the yoke S that depends from the bottom of the body. In this form of the invention the dumping lever is shown as having its fulcrum at a considerable distance from the point at which the car body is pivoted to the truck frame and in this construction as in that hereinbefore described the length of the dumping lever serves to enable the dumping piston to more readily and effectively tilt the body of the car. In this last construction also the rods by which the automatic cut-off and the escape valves are operated are shown as attached directly to the body of the car.

It is manifest that the precise details of construction above set out may be varied within wide limits without departing from the spirit of the invention and I do not wish therefore to be understood as restricting my invention to such details except as specifically defined in the following claims.

Having thus described the invention, what I claim as new, and desire to secure by Letters Patent, is—

1. In a dump-car the combination with the tilting body, of a door for said body, a fixed support for said door and a lost motion connection between said support and said door whereby the door is allowed to travel for a short distance with the car body, substantially as described.

2. In a dump-car the combination with the tilting body, of a pivoted door for said body, a fixed support for said door, and a lost motion connection between said support and said door, substantially as described.

3. In a dump-car the combination with the tilting body, of a door for said body, a fixed support for said door and a movable fulcrum for said door whereby it is allowed to travel for a distance with the car body, substantially as described.

4. In a dump-car the combination with the tilting body, of a door for said body, fixed standards at the opposite ends of the car and slotted links connected to said standards and pivot pins connecting the door with the slotted links, substantially as described.

5. In a dump-car the combination with the tilting body, of a door for said body, a fixed support for said door, a lost motion connection between said fixed support and said door, and means for holding the door in closed position during a part of the movement of the body, substantially as described.

6. In a dump-car the combination with the tilting body, of a door for said body, a fixed support for said door comprising end standards and a rod or rods extending between said standards, substantially as described.

7. In a dump-car the combination with the tilting body of a door for said body, a fixed support for said door comprising the standards at the ends of the car, a rod or rods extending between said standards and links to which the door is pivotally connected, said links being attached to said rods, substantially as described.

8. In a dump-car the combination with the tilting body of a dumping cylinder and a piston provided with means independent of and unattached to said body and arranged to positively both tilt and restore the same, substantially as described.

9. In a dump-car the combination with the tilting body of a dumping cylinder and piston and lever mechanism intermediate said piston and the car body whereby the force of of the piston is exerted to operate the car body, substantially as described.

10. In a dump-car the combination with the tilting body of a dumping cylinder and piston and lever mechanism intermediate said piston and the car body, said lever mechanism being pivoted at one side of the pivot point of the tilting body, substantially as described.

11. In a car-body the combination with the tilting body of a dumping cylinder and piston and lever mechanism intermediate said piston and the car body, said lever mechanism being united by a lost motion connection to the piston rod of the dumping cylinder, substantially as described.

12. In a dump-car the combination with the tilting body of a dumping cylinder and piston, and lever mechanism intermediate said piston and the car body, said lever mechanism being arranged to engage the car body on the opposite sides of its pivot point in order to both tilt and restore said body, substantially as described.

13. In a dump-car the combination with the tilting body of a dumping cylinder and piston, a dumping lever pivotally connected to the truck frame and having a free end arranged to bear against the car body, said lever being suitably attached to the piston rod of the dumping cylinder, substantially as described.

14. In a dump-car the combination with the tilting body and with the cylinder and piston for operating said body of an automatic latch for temporarily locking said car body, a weight or its equivalent for throwing said latch normally out of action and dogging mechanism for engaging said latch to hold the same in closed position, said dogging mechanism being arranged to be operated by the piston of the dumping cylinder, substantially as described.

15. In a dump-car the combination with the tilting body having a pin or projection, a laterally movable latch for engaging said pin or projection, dogging mechanism for obstructing said latch and a handle for shifting said latch laterally to release the same, substantially as described.

16. In a dump-car the combination with the tilting body having a pin or projection and with a dumping cylinder and piston of a pivoted automatic latch for engaging said pin or projection, a weight or equivalent means for throwing said latch out of action and dogging mechanism for holding said latch in closed position, said dogging mechanism being suitably connected to the piston rod of the dumping cylinder, substantially as described.

17. In a dump-car the combination with the tilting body and with a cylinder and piston for operating said body of a pivoted automatic latch for locking said body, a dumping lever for tilting said body, said lever having a part adapted to extend in position to engage the automatic latch and temporarily hold the same in closed position, substantially as described.

18. In a dump-car the combination with the tilting body and with a dumping cylinder and piston for operating said body, of a laterally movable pivoted latch for locking said body, a dogging mechanism connected with the piston of the dumping cylinder for checking the movement of said latch and a handle for shifting said latch to free the same from the dogging mechanism, substantially as described.

19. In a dump car the combination with the tilting body and with the dumping cylinder and piston, of a pivoted automatic latch, a pin or projection on the car with which said latch engages and dogging mechanism for locking said latch, the upper end of said latch being so bent that it can be forced outward by the movement of said pin or projection when the dogging mechanism is released, substantially as described.

EDWARD A. TRAPP.

Witnesses:
  GEO. P. FISHER, Jr.,
  ALBERTA ADAMICK.